United States Patent [19]

Layne

[11] Patent Number: 6,000,527
[45] Date of Patent: Dec. 14, 1999

[54] PRODUCT LANE FORMING CONVEYOR SYSTEM AND RELATED METHOD

[75] Inventor: James L. Layne, Bowling Green, Ky.

[73] Assignee: Span Tech LLC, Glasgow, Ky.

[21] Appl. No.: 09/090,832

[22] Filed: Jun. 4, 1998

[51] Int. Cl.[6] .................................................. B65G 47/12
[52] U.S. Cl. ............................................................ 198/446
[58] Field of Search ................................. 198/416, 445, 198/446, 457.07, 598, 443

[56] References Cited

U.S. PATENT DOCUMENTS

| | | | |
|---|---|---|---|
| 3,623,592 | 11/1971 | Anderson | 198/446 |
| 4,164,277 | 8/1979 | Fluck et al. . | |
| 4,222,478 | 9/1980 | Gasser . | |
| 4,231,463 | 11/1980 | Vamvakas | 198/446 |
| 4,485,912 | 12/1984 | Carmichael et al. . | |
| 4,860,882 | 8/1989 | Maeda et al. . | |
| 4,953,693 | 9/1990 | Draebel . | |
| 5,031,757 | 7/1991 | Draebel et al. . | |
| 5,480,278 | 1/1996 | Morgan . | |
| 5,584,373 | 12/1996 | Layne . | |
| 5,749,454 | 5/1998 | Layne . | |

FOREIGN PATENT DOCUMENTS

| | | | |
|---|---|---|---|
| 238774 | 9/1986 | Germany | 198/446 |
| 4-3715 | 1/1992 | Japan | 198/446 |
| 6716950 | 6/1969 | Netherlands | 198/446 |
| 0308022 | 1/1969 | Sweden | 198/445 |
| 573404 | 9/1977 | U.S.S.R. | 198/446 |

*Primary Examiner*—James R. Bidwell
*Attorney, Agent, or Firm*—King and Schickli

[57] ABSTRACT

Multiple receiving conveyors receive randomly spaced product from a feeder conveyor and form discrete lanes for further processing. Upstanding wheels positioned between the receiving conveyors extend partially above the conveying surfaces. The outer periphery of the wheel is tapered and a high friction, elastic band is provided along the peripheral apex. The wheels are rotated by a driver. Randomly spaced product being conveyed and contacting the rotating wheel is actively deflected onto one of the juxtaposed receiving conveyors to form the respective product lane. Upstanding outer wheels are also positioned along the side of the outermost receiving conveyors for further assisting in deflecting and guiding the product. Successive series of downstream wheels ensure that misaligned product passing a first series of wheels is ultimately deflected onto the adjacent conveyor to form the lane.

17 Claims, 3 Drawing Sheets

PRODUCT LANE FORMING CONVEYOR SYSTEM AND RELATED METHOD

TECHNICAL FIELD

The present invention relates generally to the conveyor art and, more particularly, to a conveyor system and related method for receiving randomly spaced product and forming discrete lanes for further processing.

BACKGROUND OF THE INVENTION

In recent years, the use of conveyors in product forming, processing, and packaging operations has proliferated. Conveyors are now frequently employed as an efficient manner of moving products from one location in a production facility to another. Moreover, systems employing multiple lanes of conveyors serve to significantly improve production efficiency by permitting the simultaneous transport of product for downstream processing at single or multiple workstations throughout the facility. In addition, product laning advantageously maximizes the use of plant floor space.

Many product forming or processing operations, such as, for example, the baking or freezing of food items, are best performed on a stream of product arranged in random fashion on a relatively wide conveyor. To achieve the desirable product handling and processing, the product stream must then be separated into discrete lanes, such as for packaging. Forming these lanes has presented some difficulty in the past. This is primarily because the baking or freezing processing leaves the product in the random disarray. Simply placing a series of receiving conveyors adjacent to a feeder conveyor to form the product into lanes is not an acceptable solution, since any product not in near-perfect alignment with the respective receiving conveyor will not fall directly onto the conveying surface. This is particularly troublesome for several reasons.

First of all, if the adjacent receiving conveyors are diverging, any off-center product resting partially on one conveyor or between two adjacent conveyors will fall to the floor as spreading occurs. In food processing operations, this creates both waste and an unsanitary condition that requires clean-up. Additionally, product not falling to the floor may instead become lodged between the adjacent receiving conveyors. Subsequent product flow can "hang up" on this lodged product and form a jam, which will require deleterious production downtime to clear. Furthermore, downstream workstations depend on the product being perfectly positioned on the surface of the conveyor for performing the processing operation. Significant deviations from this condition can result in product being misformed, damaged or perhaps even destroyed.

In an attempt to improve the ability of conveyor systems to form the desirable lanes of product, the use of passive guide rails positioned between adjacent pairs of receiving conveyors has been proposed. One example of such a system is U.S. Pat. No. 4,860,882 to Maeda et al., which provides a series of conveyors, each comprised of a separate carrier units for transporting round product, such as fruit. Raised passive guide rails between the receiving conveyors deflect any misaligned product in a single plane onto the individual carrier units. Out-feed conveyors receive the product and transport it away for further processing.

While suitable for product that is capable of rolling, it should be appreciated that such passive guide rails do not serve to deflect product having substantial flat surfaces, such as, for example, frozen pancakes or the like. Such product items can come to rest against any passive guide rail, which increases the incidence of deleterious jams. Due to the fact that a great number of operations for which lane forming is desirable involve products having flat surfaces (e.g. wafer-like or disc-shaped foods, small square packages, or flat boxes), the conveyor system described in the '882 patent offers little improvement over the conventional solution described above.

Accordingly, a need is identified for a conveyor system that receives randomly spaced product and forms discrete product lanes for further processing. The system would partially lift and actively deflect any misaligned product onto the conveying surface of adjacent receiving conveyors to form the respective product lanes. Additionally, the system would be adaptable for forming any number of product lanes for any sized batch of product.

SUMMARY OF THE INVENTION

Therefore, keeping the above needs in mind, it is a primary object of the present invention to provide a conveyor system and related method for receiving randomly spaced product and forming discrete lanes of product on two or more adjacent receiving conveyors.

Another object of the present invention is to provide a product lane forming conveyor system having at least one inner wheel positioned between the adjacent receiving conveyors and extending partially above the conveying surfaces, the wheel being rotated at a relatively high speed for partially lifting misaligned product for active deflection onto the conveying surface to form a lane.

Still another object of the present invention is to provide a conveyor system having multiple wheels placed downstream from a feeder conveyor to ensure that randomly spaced product passing a first series of wheels is ultimately deflected onto an adjacent receiving conveyor to form the respective product lane.

A further object of the present invention is to provide a conveyor system which includes multiple pairs of adjacent receiving conveyors, the outermost conveyors having outer guide means positioned along the sides for partially lifting and actively deflecting misaligned product traveling along the periphery onto the conveying surface.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a product lane forming conveyor system and related method are provided. In the broadest aspects of the invention, the system comprises a feeder conveyor for supplying randomly spaced product to at least two juxtaposed receiving conveyors. Between the receiving conveyors is mounted at least one upstanding, rotatable inner wheel. This inner wheel is mounted on a shaft and positioned such that it extends partially above the conveying surfaces. In operation, rotational motion is imparted to the shaft by a suitable drive means, such as a motor. The rotating wheel contacts and partially lifts any misaligned product for active deflection onto the adjacent receiving conveyor, thereby advantageously assisting in forming discrete lanes from a randomly spaced flow of product.

In the preferred embodiment, the outer periphery of the upstanding wheel is tapered in cross-section to form a peripheral apex. A high friction elastic band is placed around the apex for aiding the lifting and deflecting function of the wheel. The use of a removable elastic band advantageously permits easy replacement of the band from the periphery of the wheel if necessary over time.

In addition to the upstanding inner wheel, outer guide means are mounted alongside both receiving conveyors. The guide means ensure that any misaligned product traveling along the periphery of the feeder is also partially lifted for active deflection inwardly onto the adjacent conveying surface. Preferably, the guide means include outer wheels extending partially above the outer edge of the conveying surface. The outer wheels and rotated in a similar fashion as the inner wheels, and thereby serve to partially lift and deflect product in a similar manner.

It is another aspect of the present invention to provide a plurality of receiving conveyors in a spaced relationship to form multiple lanes of product from a random flow. As described above, upstanding inner wheels are positioned between each pair of adjacent conveyors and outer wheels are mounted alongside the outermost receiving conveyors for contacting product traveling along the periphery of the conveyors. Using the above-described principles, it should be appreciated that the product lane forming conveyor system is adaptable for use with any width of feeder conveyor and with any number of receiving conveyors to form several discrete product lanes.

Yet another important aspect of the conveyor system is to provide successive series of downstream wheels. These downstream wheels ensure that any misaligned product only partially deflected by a preceding wheel is ultimately deflected onto the respective adjacent receiving conveyor. Each successive series of wheels is preferably coaxially mounted on a single shaft and gang driven by a single motor. Of course, the downstream wheels may also be fitted with the high friction elastic band to assist in the lifting and deflection of product.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings.

Reference will now be made in detail to the present preferred embodiment of the invention, an example of which is illustrated in the accompanying drawing.

DETAILED DESCRIPTION OF THE INVENTION

Figure 1:
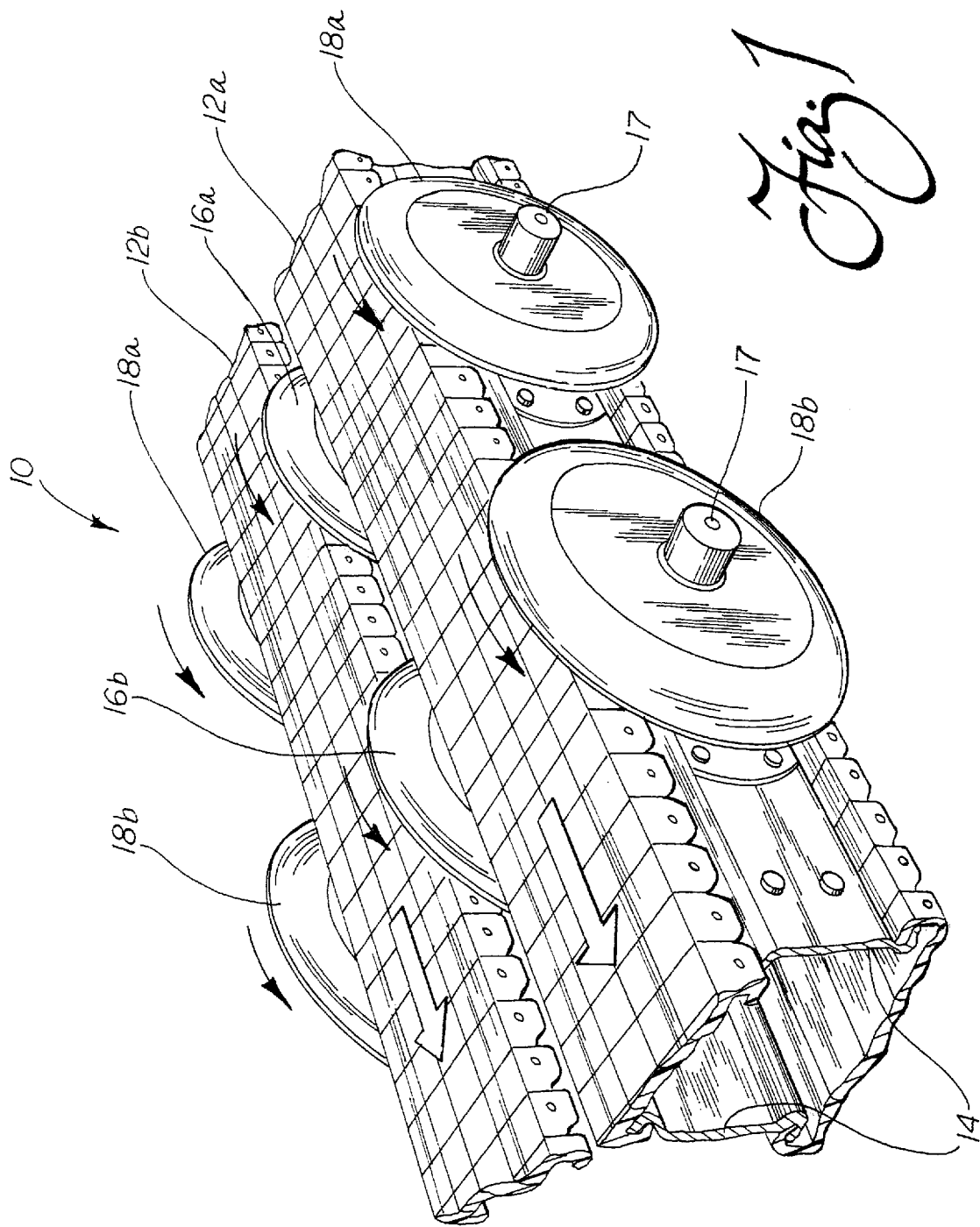
FIG. 1 is a cutaway perspective view of the conveyor system of the present invention, including two juxtaposed modular link endless conveyor belts supported by guide rails with upstanding wheels rotatably mounted both between and alongside the belts.

Reference is now made to FIG. 1 illustrating a product lane forming conveyor system 10 constructed in accordance with the principles of the present invention. The embodiment of the system 10 shown includes a pair of juxtaposed endless loop conveyor belts 12a, 12b supported by separate pairs of guide rails, which are collectively identified by reference numeral 14 (only one set shown). The belts 12a, 12b are preferably of the side-flexing type, and are thus formed from a plurality of interconnected modular links (not shown). The modular links include specialized side links formed by the inclusion of depending arms having inwardly projecting guide tabs for engaging the guide rails 14 on both the forward and return runs. A detailed description of such a conveyor belt can be found in both Applicant's issued U.S. Pat. Nos. 4,953,693 and 5,031,757, the disclosures of which are incorporated herein by reference.

In accordance with an important aspect of the present invention, a plurality of upstanding wheels 16, 18 are positioned adjacent to the conveyor belts 12a, 12b for forming the discrete product lanes from a randomly oriented product feed. More particularly, a first pair of inner upstanding wheels 16a, 16b are mounted between the belts 12a, 12b such that the periphery of each extends partially above the conveying surface. Mounted alongside both conveyor belts 12a, 12b are separate pairs outer wheels 18a, 18b, also extending partially above the conveying surface.

As illustrated in FIG. 1, the inner and outer sets of wheels 16, 18 are coaxially mounted on separate shafts 17. Both shafts 17 are primarily supported by the conveyor belt guide rails 14, but are positioned so as not to interfere with the operation of the belts 12a, 12b. To impart rotational motion to the wheels 16, 18, the shafts 17 are driven by a driver, such as an electric motor (see FIGS. 2 and 3), and may be individually or gang driven. As illustrated by the action arrows in FIG. 1, the direction of rotation of the wheels 16, 18 is preferably the same as the direction of travel of the endless loop belts 12a, 12b (shown as counterclockwise rotation).

Figure 2:
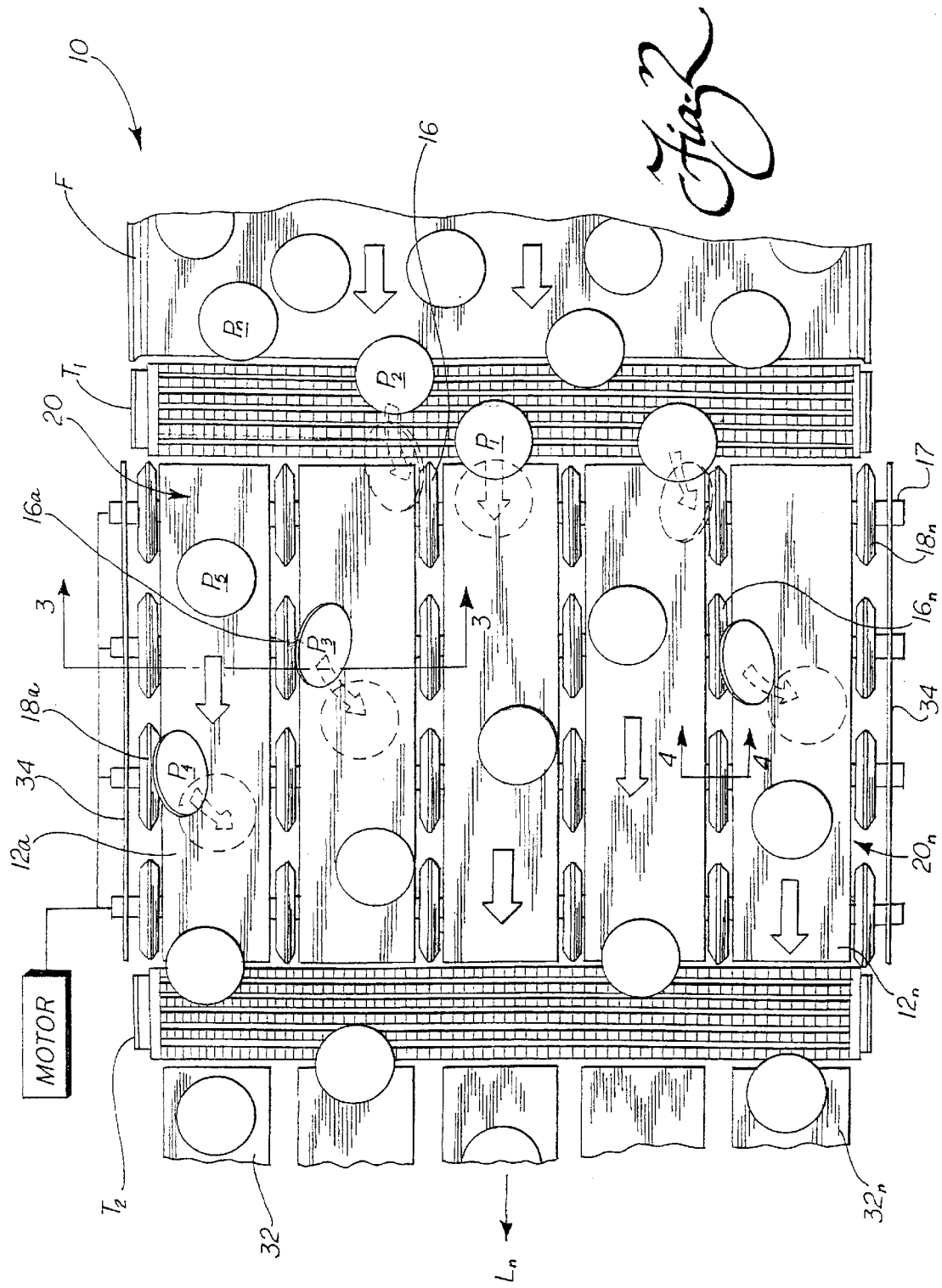
FIG. 2 is a top plan view of a conveyor system including a feeder conveyor for supplying randomly spaced product to a plurality of juxtaposed conveyor belts, each belt having a series of gang driven upstanding wheels mounted therebetween for actively deflecting individual product into the respective lane.
Figure 3:
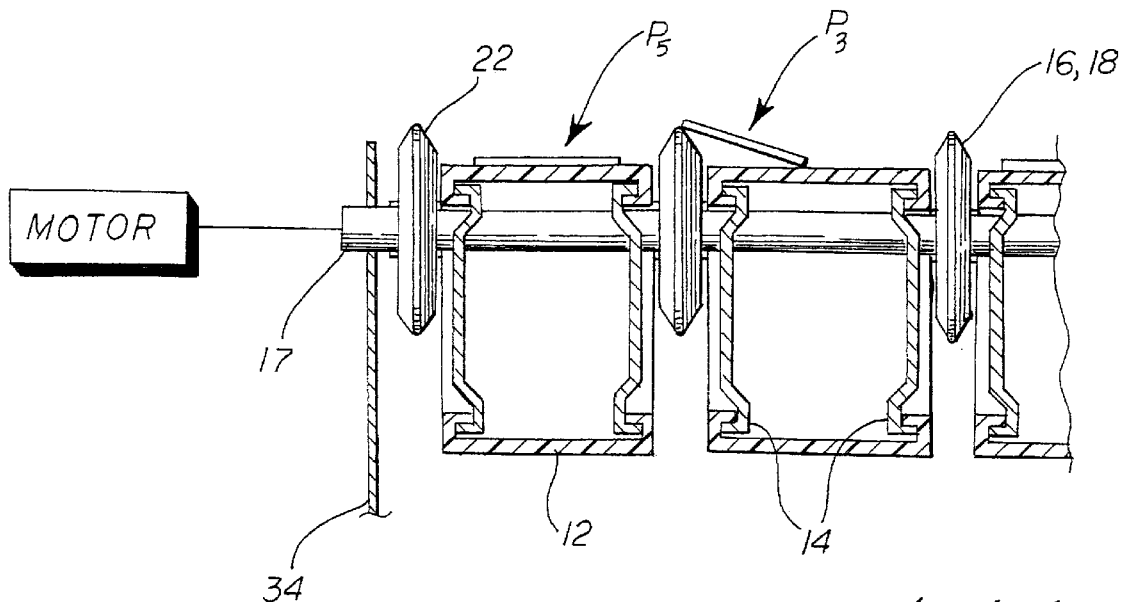
FIG. 3 is a cutaway cross-sectional view of the conveyor system along line 3—3 of FIG. 2, showing in particular the shaft and the coaxially mounted, gang driven upstanding wheels.

A preferred embodiment of the product lane forming system 10 is illustrated in FIG. 2. The system 10 shown is adapted to include a plurality of endless loop modular link belts 12, 12$_n$ to form a series of discrete product lanes 20, 20$_n$. A plurality of upstanding inner wheels 16, 16$_n$ are mounted between each pair of juxtaposed belts 12, 12$_n$, and a plurality of outer wheels 18, 18$_n$ are positioned alongside the outermost belts in the system 10. Of course, both the inner and outer wheels 16, 18 are mounted such that the periphery of the upstanding wheels 16, 18 extends partially above the conveying surface to permit the desired partial lifting and deflection for forming product lanes.

Figure 4:
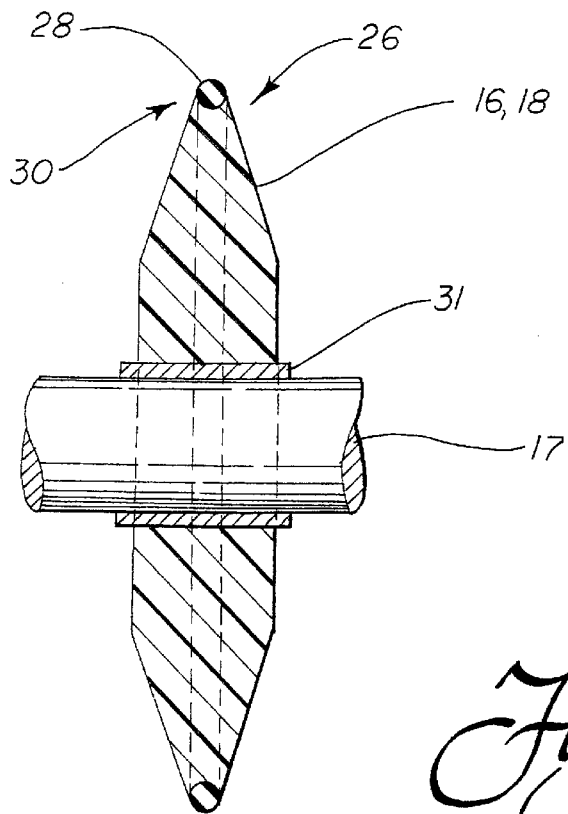
FIG. 4 is a cross-sectional view of a single upstanding wheel along line 4—4 of FIG. 2, showing in particular the high friction elastic band placed around the peripheral apex of the wheel for assisting in the lifting and active deflection of the randomly spaced product.

It should be appreciated that the wheels 16, 18 are substantially identical in shape. As best shown in FIG. 4, as well as partially illustrated in FIGS. 1 and 2, each wheel 16, 18 is tapered in cross-section to form a peripheral apex 26. Preferably, the wheels 16, 18 are formed of a lightweight, durable and inexpensive plastic material such as, for example ultra-high molecular weight polyethylene (UHMW-PE). Such materials generally have smooth surfaces that permit easy cleaning, a necessary characteristic for any component used for conveying food products or the like. However, it should be recognized that such materials provide a relatively smooth surface. Thus, to further assist the wheels 16, 18 in gripping the product $P_n$ for providing the desired lift, an elastic band 28 formed of plastic or rubber material with a relatively high coefficient of friction is placed around the circumference of each wheel 16, 18. The band is seated in a peripheral groove 30 along the apex 26. Thus, once stretched over the periphery, the band 28 securely rests in the groove 30, but is partially exposed for contacting the product $P_n$. Also, the wheel 16, 18 is mounted to the shaft 17 using a high coefficient of friction sleeve 31 or the like.

In operation, a feeder conveyor F supplies a continuous stream of randomly spaced product, including individual product units $P_n$, to the system 10. The feeder conveyor F can be a vibrating stationary sloped chute, a conveyor belt, or any other arrangement known in the art for transporting relatively small product P, $P_n$. By way of example, the feeder F is shown transporting frozen pancakes that have been recently released from a "spiral freeze" (not shown) in a randomly oriented stream. It should be recognized, however, that the principles of the present invention may be used for any shape of product, and is particularly adapted for use with product having flat surfaces that would hang up on a lane forming conveyor system utilizing merely passive guide rails.

Downstream from the feeder conveyor F, a transfer assembly $T_1$ is provided for assisting the product $P_n$ in transitioning between the feeder F and the multiple lanes of the conveyor system 10. The transfer assembly $T_1$ is preferably of the type as described in Applicant's issued U.S. Pat. No. 5,584,373, showing a passive roller transfer assembly, or U.S. Pat. No. 5,749,454, showing a driven roller transfer assembly, the complete disclosures of which are both incorporated herein by reference. Upon exiting the transfer assembly $T_1$, the product $P_n$, still randomly oriented, reaches the lane forming portion of the system 10. As outlined above, this includes a plurality of juxtaposed conveyor belts 12, $12_n$ positioned in a substantially parallel relationship. As illustrated in FIG. 2, the combined width of the plurality of belts 12, $12_n$ is ideally such that it covers the entire width of the feeder F. This ensures that the product $P_n$ does not escape the lane forming operation.

As should be appreciated, any product $P_n$ exiting the roller transfer $T_1$ may be in substantial alignment with the respective lane 20. In this case, it is simply conveyed to a downstream transfer assembly $T_2$ and ultimately to the respective out-feed conveyors 32, $32_n$. For example, aligned product item $P_1$ could transition from the transfer $T_1$ to the respective conveyer 12 and be transported downstream directly to the out-feed conveyor 32 to form product lane $L_n$.

However, as shown in FIG. 2, the usual situation is where the items $P_n$ are not perfectly aligned, and thus the improved product lane forming capabilities of the system 10 are required. Thus, as illustrated, the product $P_n$ transitions from the feeder conveyor F and is misaligned with the respective individual conveyor 12. When such misaligned product, such as product $P_2$, reaches the conveyor 12 it contacts the first in the series of upstanding rotating wheels 16. Upon contacting the wheel 16, which is rotating at a relatively high rate of speed, the product $P_2$ is partially lifted and actively deflected onto the respective adjacent conveyor 12 (see action arrow and phantom outline of product). Thus, after deflection, product $P_2$ comes to rest aligned in the respective lane and ready for easy and efficient transfer to its respective out-feed conveyor 32.

It should also be appreciated from viewing FIG. 2 that in addition to the inner wheels 16, similar upstanding inner wheels 16 are provided downstream. These wheels 16 serve to contact, lift and deflect any product $P_n$ that is not adequately deflected by a first wheel, or product $P_n$ that is deflected by a first wheel toward the opposite side of the respective conveyor 12, $12_n$. For instance, product $P_3$ is shown in FIG. 2 as being partially lifted by downstream wheel 16a and deflected onto the adjacent conveyor 12. It has been determined that for the particular shape and dimensions of the product shown (that is, small disc-shaped frozen pancakes of approximately four to five inches in diameter), three to four consecutive downstream wheels are sufficient to ensure that all misaligned product is ultimately deflected into the proper lane 20. However, it should be recognized that the principles of the present invention may be applied with fewer, or more, downstream wheels, depending on the different sizes and shapes of products on which the lane forming operation is performed.

As described above, in addition to upstanding inner wheels 16 mounted between the conveyors 12, upstanding outer wheels 18 are positioned along the outer side of the outermost conveyor belts 12. Thus, any product $P_n$ exiting the transfer assembly $T_1$ and approaching the periphery is actively deflected onto the respective conveying surface to form the desired product lane 20. For example, as illustrated in FIG. 2, peripherally travelling product $P_4$ is being partially lifted for deflection onto the adjacent conveyor 12a by wheel 18a.

As briefly described above, and as best shown in FIGS. 2 and 3, each row of upstanding wheels 16, 18 is coaxially mounted on a single shaft 17 and driven by a motor. A single motor can be used to drive each individual shaft (see FIG. 3), or the single motor can be coupled to a suitable transmission (not shown) for gang driving the shafts 17. Of course, simultaneously driving the shafts with a single motor imparts rotational motion to each set of wheels 16, 18 at the same angular velocity, thereby ensuring adequate product lifting and deflection throughout the system 10. Although each shaft 17 extends through and is primarily supported by the guide rails 14, separate external frames 34 and bearings (not shown) are provided.

In summary, an improved product lane forming conveyor system 10 is disclosed. The system 10 includes multiple conveyors 12, $12_n$ placed in a juxtaposed relationship that receive randomly spaced product $P_n$ from a feeder conveyor F. A series of upstanding wheels 16 positioned between and extending partially above each pair of receiving conveyors 12 contact and lift the product $P_n$ for deflection onto the adjacent conveying surfaces (see FIG. 2). Upstanding outer wheels 18 positioned alongside the outermost conveyors further assist in deflecting and guiding any product $P_n$ traveling along the periphery. Successive series of wheels 16, $16_n$, 18, $18_n$ positioned downstream from the feeder conveyor F ensure that any randomly spaced product $P_n$ passing a first series of wheels is ultimately deflected onto the adjacent conveyor. Appropriate out-feed conveyors 32 receive product $P_n$ in discrete lanes and transport it away for further processing.

A method for forming randomly spaced product into product lanes on juxtaposed receiving conveyors by using one or more upstanding wheels positioned between the conveyors is also provided. The method includes the steps of delivering the randomly spaced product from a feeder conveyor onto the conveying surface of each of the receiving conveyors and rotating said wheel for contacting, partially lifting and actively deflecting the product onto one of the receiving conveyors to form the respective product lane.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A conveyor system for receiving randomly spaced product from a feeder conveyor and forming product lanes on at least two juxtaposed receiving conveyors, comprising:

each receiving conveyor having a conveying surface for said product in the respective product lanes;

at least one upstanding inner wheel positioned between said receiving conveyors, said wheel extending partially above said conveying surfaces;

a driver for rotating said wheel;

said rotating wheel contacting partially lifting, and actively deflecting product sideways onto one of said receiving conveyors to form the respective product lane.

2. The conveyor system according to claim 1, wherein said upstanding inner wheel is tapered to form a peripheral apex around the circumference.

3. The conveyor system according to claim 2, wherein is provided an elastic band along the peripheral apex of said wheel for frictionally engaging the product, whereby said band assists in deflecting the product to form said product lanes during transition between the feeder and said receiving conveyors.

4. The conveyor system according to claim 1, further including outer guide means for deflecting product onto the adjacent receiving conveyor to assist in the product lane forming.

5. The conveyor system according to claim 4, wherein said outer guide means includes at least one upstanding outer wheel rotatably driven for actively deflecting said product.

6. The conveyor system according to claim 5, wherein said inner wheel and said outer wheel are coaxially mounted and gang driven by said driver.

7. The conveyor system according to claim 1, wherein said receiving conveyors are modular conveyors including a plurality of links to allow side and elevational flexing.

8. The conveyor system according to claim 1, wherein said at least two receiving conveyors are positioned in a parallel relationship.

9. A conveyor system for forming product lanes, comprising:

a feeder conveyor for supplying randomly spaced product;

a plurality of juxtaposed receiving conveyors, each of said receiving conveyors having a conveying surface for said product in the respective product lanes;

a plurality of upstanding inner wheels positioned between each of said plurality of receiving conveyors, said wheels extending partially above said conveying surfaces;

a driver for rotating each of said wheels;

said rotating wheels contacting, partially lifting and actively deflecting product sideways onto one of said receiving conveyors to form the respective product lane.

10. The conveyor system according to claim 9, wherein said feeder conveyor is a single relatively wide modular conveyor belt, including a plurality of links to allow side and elevational flexing.

11. The conveyor system according to claim 9, further including outer guide means for deflecting product onto the adjacent receiving conveyor to assist in the product lane forming.

12. The conveyor system according to claim 11, wherein said outer guide means includes at least one upstanding outer wheel rotatably driven for said deflection of said product.

13. The conveyor system according to claim 12, wherein said inner wheel mounted between each of said plurality of receiving conveyors and said outer wheel are coaxially mounted and gang driven by said driver.

14. A conveyor system for receiving randomly spaced product from a feeder conveyor and forming product lanes on at least two juxtaposed receiving conveyors, comprising:

each receiving conveyor having a conveying surface for said product in the respective product lanes;

at least one upstanding inner wheel positioned between said receiving conveyors and extending partially above said conveying surfaces, said wheel having a substantially tapered cross section to form a product engaging peripheral apex for contacting and actively deflecting product being conveyed onto one of said receiving conveyors to form the respective product lane; and a driver for rotating said wheel.

15. A conveyor system for receiving randomly spaced product from a feeder conveyor and forming product lanes on at least two juxtaposed receiving conveyors, comprising:

each receiving conveyor having a conveying surface for said product in the respective product lanes;

rotating means positioned between said receiving conveyors and extending partially above said conveying surfaces for contacting, partially lifting, and actively deflecting product being conveyed sideways onto one of said receiving conveyors to form the respective product lane.

16. The conveyor system according to claim 15, wherein said rotating means is an upstanding wheel having a substantially tapered cross section to form a product engaging apex.

17. A method for forming randomly spaced product into product lanes on at least two juxtaposed receiving conveyors having conveying surfaces with at least one upstanding wheel positioned between said conveyors and extending partially above said conveying surfaces, comprising:

delivering the randomly spaced product from a feeder conveyor onto said conveying surface of each of said receiving conveyors; and rotating said wheel for contacting, partially lifting and actively deflecting the product sideways onto one of said receiving conveyors to form the respective product lane.

* * * * *